US009726534B2

United States Patent
Gempp

(10) Patent No.: US 9,726,534 B2
(45) Date of Patent: Aug. 8, 2017

(54) WEIGHING DEVICE FOR PIECE GOODS

(71) Applicant: Umicore AG & CO. KG, Hanau (DE)

(72) Inventor: Joachim Gempp, Neuenburg (DE)

(73) Assignee: UMICORE AG & CO. KG, Hanau (DE)

( * ) Notice: Subject to any disclaimer, the term of this patent is extended or adjusted under 35 U.S.C. 154(b) by 170 days.

(21) Appl. No.: 14/397,160

(22) PCT Filed: Apr. 26, 2013

(86) PCT No.: PCT/EP2013/058732
§ 371 (c)(1),
(2) Date: Oct. 24, 2014

(87) PCT Pub. No.: WO2013/160451
PCT Pub. Date: Oct. 31, 2013

(65) Prior Publication Data
US 2015/0114728 A1    Apr. 30, 2015

(30) Foreign Application Priority Data
Apr. 27, 2012 (EP) .................................... 12166054

(51) Int. Cl.
G01G 19/03 (2006.01)
G01G 21/00 (2006.01)

(52) U.S. Cl.
CPC ........... *G01G 19/03* (2013.01); *G01G 19/035* (2013.01); *G01G 21/00* (2013.01)

(58) Field of Classification Search
CPC ........ G01G 11/00; G01G 11/04; G01G 19/03; G01G 19/035; G01G 21/00
See application file for complete search history.

(56) References Cited

U.S. PATENT DOCUMENTS 2,597,069 A * 5/1952 Conti ..................... G01G 19/03
177/145
3,545,588 A * 12/1970 Corley ..................... B65C 9/02
177/145
(Continued)

FOREIGN PATENT DOCUMENTS

EP    0 371 172 A1    6/1990
EP    1 620 200 A1    2/2006
(Continued)

OTHER PUBLICATIONS

Notification of Transmittal of the International Search Report (with English translation) and The Written Opinion for Application No. PCT/EP2013/058732 mailed Jun. 10, 2013.
(Continued)

*Primary Examiner* — Natalie Huls
(74) *Attorney, Agent, or Firm* — Smith, Gambrell & Russell, LLP

(57) ABSTRACT

Weighing device used with piece goods, having a belt conveyor, one or more below positioned scales of rigid arrangement and a support for goods being weighed. The belt conveyor has at least two belts. The support has at least one support extension guidable through between the belts, and the belts can move toward the scale such that support extensions are guided through between the conveyor belts without moving themselves. Goods moved on the belts are laid upon the support extensions and weighed. The conveyor unit above the scale is moveable, in its entirety, towards the weighing scale. Conveyor movement end positions are damped. The conveyor is moved by a single actuator, and at least two weighing scales are used with different weighing regions. A coating installation for car exhaust gas catalyst carriers is provided with the weighing device. A method of
(Continued)

weighing piece goods using the weighing device is provided.

20 Claims, 9 Drawing Sheets

(56) References Cited

U.S. PATENT DOCUMENTS

| | | | | |
|---|---|---|---|---|
| 3,955,665 | A | * | 5/1976 | Pettis, Jr. ............... G01G 15/00 |
| | | | | 177/145 |
| 3,959,520 | A | | 5/1976 | Hoyer et al. |
| 4,208,454 | A | | 6/1980 | Reed et al. |
| 4,566,584 | A | * | 1/1986 | Lindstrom ........... G01G 11/003 |
| | | | | 177/145 |
| 4,711,314 | A | * | 12/1987 | Suzuki .................. G01G 21/00 |
| | | | | 177/164 |
| 4,901,808 | A | | 2/1990 | Wu |
| 5,736,685 | A | * | 4/1998 | Nakajima .............. G01G 11/16 |
| | | | | 177/145 |
| 6,252,181 | B1 | * | 6/2001 | Fallas .................... G01G 15/00 |
| | | | | 177/119 |
| 8,716,608 | B2 | * | 5/2014 | Karlsson ................ G01G 15/00 |
| | | | | 177/1 |
| 8,969,743 | B2 | * | 3/2015 | Huebler ............... G01G 19/005 |
| | | | | 177/145 |
| 2006/0095228 | A1 | | 5/2006 | Wilby |
| 2008/0118628 | A1 | | 5/2008 | Harris et al. |
| 2009/0130294 | A1 | * | 5/2009 | Fehnle ................. B01J 37/0215 |
| | | | | 427/9 |
| 2011/0150619 | A1 | * | 6/2011 | Nilsson .................. B65B 35/36 |
| | | | | 414/738 |

FOREIGN PATENT DOCUMENTS

| | | |
|---|---|---|
| EP | 1 817 107 | 8/2007 |
| FR | 2 310 553 A1 | 12/1976 |
| WO | 02/03449 A2 | 1/2002 |

OTHER PUBLICATIONS

Translation of Written Opinion of the International Searching Authority for international application No. PCT/EP2013/058732 dated Oct. 27, 2014 (7pages).

* cited by examiner

WEIGHING DEVICE FOR PIECE GOODS

Weighing devices for a unit load moving on belt conveyors are known in principle.

However, numerous problems occur in all of the known solutions. Frequently, a defined and as accurate a control as possible of the conveying speed is required. The widespread complete or partial weighing of the belt conveyor at the same time and the high constant load associated therewith mean that the only suitable balances are those which can determine sufficiently high masses and are therefore limited in their accuracy and versatility. In addition, in the respective structures, the sensitivity to external interfering influences requires a casing which needs a large amount of space and there are long cycle times because of the long settling and taring times of the balances.

It was the object to eliminate these deficiencies of the prior art. The object is achieved by a weighing device for a unit load, which has a belt conveyor and at least one balance which is arranged below the belt conveyor and has a support for the goods to be weighed, wherein the balance is arranged rigidly, the belt conveyor has at least two conveyor belts, the support for the goods to be weighed is provided with at least one support extension which can be guided through between the conveyor belts of the belt conveyor, and the conveyor belts of the belt conveyor can be at least partially moved toward the balance in such a manner that the support extensions are moved through between the conveyor belts without a dedicated movement, and a unit load moving on the conveyor belts can be placed onto the support extensions and weighed by the balance.

BRIEF DESCRIPTION OF THE INVENTION

1. A weighing device for a unit load, which has a belt conveyor and at least one balance which is arranged below the belt conveyor and has a support for the goods to be weighed, wherein the balance is arranged rigidly, the belt conveyor has at least two conveyor belts, the support for the goods to be weighed is provided with at least one support extension which can be guided through between the conveyor belts of the belt conveyor, and the conveyor belts of the belt conveyor can be at least partially moved toward the balance in such a manner that the support extensions are moved through between the conveyor belts without a dedicated movement, and a unit load moving on the conveyor belts can be placed onto the support extensions and weighed by the balance.
2. The weighing device according to point 1, wherein the belt conveyor unit arranged above the balance can be moved toward the balance.
3. The weighing device according to point 1 or 2, which has a plurality of support extensions.
4. The weighing device according to one or more of points 1 to 3, which has a plurality of conveyor belts.
5. The weighing device according to one or more of points 1 to 4, wherein the support extensions are arranged in two or three rows running transversely with respect to the conveying direction of the belt conveyor.
6. The weighing device according to one or more of points 1 to 5, wherein the belt conveyor has two to twenty conveyor belts.
7. The weighing device according to one or more of points 1 to 6, wherein the end positions of the movement of the belt conveyor are damped.
8. The weighing device according to point 7, wherein the damping takes place mechanically or electronically.
9. The weighing device according to point 7 or 8, wherein the damping takes place mechanically via an eccentric disk.
10. The weighing device according to one or more of points 1 to 9, wherein the belt conveyor is moved by a hydraulic, pneumatic or electric actuator.
11. The weighing device according to one or more of points 1 to 10, wherein the weighing device has a sensor for detecting the transported unit load on the belt conveyor and the arrangement above the support extensions.
12. The weighing device according to one or more of points 1 to 11, wherein the lifting movement is guided, in particular by a guide selected from the group consisting of ball guide, friction guide, column-type ball guide and combinations thereof.
13. The weighing device according to one or more of points 1 to 12, wherein the weighing device has two, three or four balances.
14. The weighing device according to one or more of points 1 to 13, wherein the balance is encased and protected against interfering influences.
15. The weighing device according to one or more of points 1 to 14, wherein the belt conveyor has one or more guide rails for the correct supply of the unit load to be weighed.
16. A method for weighing a unit load with a device according to one of the preceding patent claims, with the following steps
    transporting the unit load to be weighed to a suitable position above the support extensions;
    stopping the belt conveyor;
    optionally taring one or more balance(s);
    lowering the unit load onto the support extensions by reducing the tension of the conveyor belts or by at least partially lowering the belt conveyor;
    determining the weight of the unit load by the force effect thereof on a balance;
    raising the unit load from the support extensions by increasing the tension of the conveyor belts or by at least partially raising the belt conveyor;
    transporting away the unit load.
17. The method for weighing a unit load according to point 16, wherein the unit load is a car exhaust gas catalyst, a monolith for producing a car exhaust gas catalyst, an initial product thereof, a packaging made from cardboard, plastic or metal or combinations thereof, or a container for foodstuffs.
18. The use of the weighing device according to one or more of points 1 to 15 in a method for producing car exhaust gas catalysts.
19. A coating installation for carriers of car exhaust gas catalysts, which has at least one first weighing device which is arranged upstream of the coating station, a coating station for coating carriers for car exhaust gas catalysts, and a second weighing device which is arranged downstream of the coating station, wherein at least one of the weighing devices is a weighing device according to one of points 1 to 15.
20. The coating installation according to point 19, wherein a correction station is arranged downstream of the second weighing device.
21. The coating installation according to point 19 or 20, wherein a third weighing device according to the present patent application is arranged behind the correction station.
22. The coating installation according to one of points 19 to 21, wherein belt conveyors are arranged between the weighing devices, coating station and correction station.

23. The coating installation according to one of points 19 to 21, wherein the weighing devices are connected to a process control or a computer which carries out the required calculations for carrying out the method and controls the various components of the coating installation.

DETAILED DESCRIPTION OF THE INVENTION

The weighing device is designed for weighing a unit load, wherein the term unit load basically includes all individual articles of merchandise or workpieces requiring weighing. These may include car exhaust gas catalysts and substrates thereof; bottles or cans before and/or after filling, and the like.

Said goods are moved on one or more belt conveyors, wherein said goods are subject to any further process measures at various processing stations, wherein filling, coating, evacuating or grinding, welding and cleaning are mentioned merely by way of example.

The weighing device has a belt conveyor and has at least one balance arranged below the belt conveyor. The balance can be one or more commercially available balances which are customarily provided with a support for the goods to be weighed.

In the weighing device construction, the balance is mounted rigidly, i.e. the balance is not moved for carrying out the weighing operation. The belt conveyor has at least two conveyor belts, but, alternatively, two separate belt conveyors can also be used. The support for the goods to be weighed is provided with at least one support extension which can be guided through between the conveyor belts of the belt conveyor or of the belt conveyors.

It is therefore apparent that, although the use of two belt conveyors is possible, the more complicated construction caused thereby is intended to be used only when absolutely necessary, for example because of the size of the unit load to be weighed.

The support extensions can be, for example, one or more web plates which can be guided through the intermediate space between the conveyor belts. However, use can also be made of cylindrical or rod-shaped extensions or any other shapes can be used. By means of this construction, it is avoided that the belt conveyor has to be entirely or partially weighed at the same time, and therefore the constant load of the balance is reduced. Depending on the size and shape of the support extensions, use can not only be made of an individual support extension, but also a plurality of support extensions. This makes it possible to prevent the unit load which is to be weighed from being raised only on one side and falling over, or else a unit load divided into small sections being guided past the support extensions, both of which prevents weighing. This also makes it possible to dispense with centering elements which are intended to carry out the same purpose. From 1 to 20, or 3 to 15 or 5 to 12 support extensions have proven successful. It is apparent that only as many support extensions can be arranged in a row perpendicular to the conveying direction of the belt conveyor as there are intermediate spaces between the conveyor belts, and therefore the number of conveyor belts is in relation to the support extensions arranged next to one another. Use can therefore also be made of a plurality of conveyor belts, wherein generally 2 to 20, or 3 to 16 or 4 to 12 or 6 to 10 suffice for most applications.

The support extensions can be arranged in a plurality of rows transversely with respect to the conveying direction of the belt conveyor. Generally, 1 to 5 rows or 2 to 4, for example 3 to 4 rows, have proven successful in this case. The weighing device can therefore be adapted to a large number of different unit loads by means of the number and width of the conveyor belts, the number of rows of the support extensions and the number of support extensions.

The conveyor belts of the belt conveyor can be at least partially moved toward the balance in such a manner that the support extensions are guided through between the conveyor belts without a dedicated movement, and a unit load moving on the conveyor belts can be placed onto the support extensions and weighed by the balance.

This construction makes it possible to mechanically separate the balance from the belt conveyor, and therefore, with little outlay, the interfering influences caused by the operation of the belt conveyor are reduced and the weighing of the belt conveyor at the same time is avoided.

The movement of the conveyor belts toward the balance serves for depositing the unit load onto the support extensions of the balance such that the unit load can be weighed. The movement of the conveyor belts toward the balance is brought about by the lowering of the entire belt conveyor construction, i.e. the belt conveyor in its entirety. Depending on where the balance and the support extensions are arranged, it may suffice to lower only one part, such as an end of the belt conveyor, so as to deposit the unit load onto the support extensions. In the case of compact weighing devices, in which the length of the belt conveyor is only slightly greater than the length of the balance and of the support extensions, lowering of the conveyor belts or of the belt conveyor over the entire length is frequently expedient since this is generally possible without additional structure costs. The magnitude of the lowering depends on the unit load used and the structural details of the weighing device. A lowering (and raising again) by 3 mm to 30 mm, in particular 5 to 20 mm or by 8 to 12 mm has proven successful in practice. The lifting movement can advantageously be guided. This can take place by means of components which are known and proven in general, in particular by ball guides, friction guides, column-type ball guides and combinations thereof. Components of this type are known to be smooth-running and stable and are known and are commercially available, for example, as NSK or INA ball bearings and guide profiles, as a guide rail, or as NSK/INA guide carriages.

In a specific embodiment, the entire belt conveyor is therefore lowered.

The lowering of the belt conveyor can be brought about by various actuators. For example, pneumatic, hydraulic or else electrical actuators are suitable. Such an actuator raises the belt conveyor and lowers the latter again. This can generally be brought about via a mechanical system consisting of, for example, levers.

In a further specific embodiment, the end position of the belt conveyor during the lowering operation is damped. Depending on the type of actuator, the damping can be mechanical or electronic damping, wherein the latter should be understood as meaning damping via an electronic influencing of the movement of an electric actuator, for example the change in the rotational speed of an electric motor or the regulating of the movement of a magnetic actuator. This can be brought about, for example, via the control of the supplied electric voltage.

The damping can also take place mechanically irrespective of the type of actuator. In one specific embodiment of the invention, the mechanical damping takes place via an eccentric disk. In this embodiment, for example, a pneumatic or hydraulic actuator, such as a pneumatic cylinder, can be connected via a reversing lever to a shaft which has at least one eccentric disk. Said eccentric disk brings about the lowering and the raising of the belt conveyor.

The damping has the technical effect of minimizing the end position jolt of the unit load during the lowering operation, and therefore the settling time or taring time of the balance is not required or is minimized even in the event of rapid lowering or raising.

Since balance and belt conveyor are mechanically separated from each other, i.e. the balance is not influenced by movements of the belt conveyor, the balance is not moved even when the support extensions are guided through, since this is brought about exclusively by the movement of the belt conveyor. In addition, the measurement is not negatively influenced either by the operation of the belt conveyor nor by the movement thereof. The conveying speed of the belt does not have influence on the measurement result either. In addition, the separation of balance and belt conveyor has the effect that the belt conveyor does not rest on the balance and is not weighed at the same time, and therefore a smaller initial load of the balance occurs. Balances with a high degree of accuracy, but narrower measurement ranges can therefore also be used, as a result of which improved measurement accuracies can be achieved. In order to expand the measurement range, it is then possible to use a plurality of balances which can be arranged, for example, one above another. If the balances are provided with mechanical overload protection, said balances can simply be placed on one another. In order to expand the weighing range, two, three or else four balances which are placed on one another and in each case cover different weight ranges are generally sufficient. This makes it possible to provide a weighing device which can weigh a unit load within the range of from 0.1 kg to 60 kg. It is also possible for a weighing device of this type to operate within the range of 0.1 kg to 6 kg with a weight tolerance of +/−0.2 g and within the range of 6 kg to 60 kg with a weight tolerance of +/−2 g. Unit loads differing greatly in weight can be weighed with such a weighing device, i.e. without redesigning or structurally modifying the latter. In order to protect the balance or balances from interfering external influences, such as, for example, a draft or contamination, the balances can be encased in the weighing device.

For the automatic weighing, it is expediently also possible for a sensor for detecting or determining the position of the conveyed unit load to be weighed to be arranged on the belt conveyor, said sensor ensuring the correct arrangement above the support extensions. Examples of suitable sensors may include a camera, an arrangement of one or more light barriers or capacitive sensors in order to determine or to detect the position of the unit load when the latter is arranged correctly above the support extensions.

It is also possible, by means of guide rails, to ensure a correct supply of the unit load to be weighed.

The weighing is carried out as follows. The unit load to be weighed is conveyed by the belt conveyor and as soon as said unit load has reached a suitable position above the support extensions, the belt conveyor is stopped such that the unit load is arranged above the support extensions, but is still being carried by the conveyor belts and rests on the latter. The balance can then be tared. The actuator is then activated, said actuator, by lowering the belt conveyor, causing the unit load to be lowered and to be deposited onto the support extensions, as a result of which the support extensions transmit the force effect of the unit load to the balance. Subsequently, a short waiting time of a few seconds, in particular of 0.5 to 10, or 1 to 7, or 2 to 5 or 0.6 to less than 5 seconds, is frequently required. After the weight on the balance is determined, the weighing is ended and the actuator is re-actuated and raises the belt conveyor such that the unit load rests again on the conveyor belts. By starting up of the belt conveyor, the weighed unit load is transported away. The movement of lowering the unit load onto the support extensions is damped, i.e. the movement is more rapid at the beginning than directly before the depositing. This reduces the jolt against the balance, and therefore the weighing is finished more rapidly. The invention therefore also relates to a method for weighing a unit load with a device of the present patent application, with the following steps transporting the unit load to be weighed to a suitable position above the support extensions;

stopping the belt conveyor;

optionally taring the balance;

lowering the unit load onto the support extensions by at least partially lowering the belt conveyor;

determining the weight of the unit load by the force effect thereof on a balance;

raising the unit load from the support extensions by at least partially raising the belt conveyor;

transporting away the unit load.

A car exhaust gas catalyst, a monolith for producing a car exhaust gas catalyst, initial products thereof or a container for foodstuffs, such as, for example, cans, plastics cups or dishes, and also boxes, can be used as the unit load in the method. Packagings made from cardboard, plastic or metal or combinations thereof for any purpose can advantageously also be weighed with the weighing device, for example in order to regulate the filling quantity during filling or to determine the weight for other reasons.

The invention also relates to the use of the weighing device in a method for producing car exhaust gas catalysts. For this purpose, the weighing device can readily be used in methods for producing car exhaust gas catalysts, in which car exhaust gas catalysts or initial products thereof, such as, for example, uncoated monoliths for producing car exhaust gas catalysts, are weighed for quality assurance or for checking of the amount of coating in the production process. Such methods are described, for example, in EP-A-1620200, EP-A-1817107, U.S. Pat. No. 3,959,520 or U.S. Pat. No. 4,208,454, to which reference is made.

A method for producing car exhaust gas catalysts can be carried out as follows. The uncoated, ceramic or metallic carriers are transported to the weighing device and then to a suitable position above the support extensions. The belt conveyor is stopped and the balance or the balances are optionally tared. Subsequently, the carrier is lowered onto the support extensions by at least partial lowering of the belt conveyor, and the weight of the unit load is determined by the force effect thereof on a balance. This weight is stored. The unit load is then raised from the support extensions by at least partially raising the belt conveyor. The carrier is then transported further to the coating station where a coating suspension is introduced into the interior of the carrier. The carriers can be designed as wall flow filters or flow-through honeycomb bodies and are based in general on a cylindrical body with two end sides and a circumferential surface, which body is provided from end side to end side with a multiplicity of flow passages. The area of the cylindrical body can be circular, oval, triangular or trapezoidal and generally has rounded corners.

The coating suspension can customarily be introduced by the lower end surface being submerged in the coating suspension and a negative pressure being applied to the upper end surface of the carrier, by providing a coating suspension on the upper end surface of the carrier, for example by a metering device being placed on the surface, said metering device outputting the coating suspension (in particular a certain amount of coating suspension) onto the upper end surface of the carrier and a negative pressure subsequently being applied to the lower end surface, or by introducing the coating suspension, for example pumping the latter in, from the lower end surface and the introduced coating suspension subsequently being sucked up from the lower end surface. In this case, the walls of the flow passages of the carrier can be wetted over the entire length of the carrier, and therefore of the flow passages, or else only over a partial length. Subsequently, the carrier coated in this manner is transported to the weighing device and then to a suitable position above the support extensions. The belt conveyor is stopped and the balance or the balances optionally tared. Subsequently, the lowering onto the support extensions takes place by at least partially lowering the belt conveyor, and the weight of the coated carrier is determined by the force effect thereof on a balance. This weight is stored. The previously determined weight of the uncoated carrier is then subtracted from the weight of the coated carrier that is determined after the coating, in order to obtain the amount of coating. This amount of coating is compared with a previously defined amount of coating having a minimum amount lying therebelow and a maximum amount lying above the target amount, for the coating. In the event of a deviation, an excess can be removed by a further suction step by the coated carrier being arranged on a suction station and a negative pressure being applied to the lower end surface of the carrier. In the event of a shortfall of coating suspension, the coated carrier can be provided with additional coating by metering, for example by spraying, coating suspension onto the upper end surface and subsequently or simultaneously applying a negative pressure to the lower end surface of the coated carrier. The actually applied amount is subsequently determined by re-weighing by the carrier coated in this manner being transported to the weighing device and then to a suitable position above the support extensions. The belt conveyor is stopped and the balance or the balances optionally tared. Subsequently, the lowering onto the support extensions takes place by at least partially lowering the belt conveyor, and the weight of the coated carrier is determined by the force effect thereof on a balance. This weight is stored. The previously determined weight of the uncoated carrier is then subtracted from the weight of the coated carrier that is determined after the coating, in order to obtain the amount of coating. The correction conditions, i.e. duration and/or strength of the suction, amount of coating suspension sprayed on, are likewise stored and used as the basis for correcting subsequently coated carriers.

The amount of coating suspension metered on or the strength or duration of the suction are expediently set with reference to the stored values for the correction conditions in order to bring about as precise an adaptation as possible to the excess amount of coating suspension that is to be removed or to additional coating suspension that is to be applied. In this case, recourse can either be made to a multiplicity of previous data in order to achieve as precise an adaptation as possible to the defined target amount, or else the correction conditions of the directly preceding carrier can be used. The last-mentioned procedure has the advantage that a change of, for example, the coating suspension that gradually occurs over the course of coating numerous carriers is included in the definition of the correction conditions. However, a weighted inclusion of both a multiplicity of previous data together with the correction conditions of the directly preceding carrier can also be used.

The invention also relates to a coating installation for carriers of car exhaust gas catalysts, which has at least one first weighing device according to the present patent application, which weighing device is arranged upstream of the coating station, a coating station for coating carriers for car exhaust gas catalysts, and a second weighing device according to the present patent application. A correction station can optionally be arranged downstream of the second weighing device, which correction station can undertake, for example, a subsequent suction or a retrospective application of additional coating. However, these steps can in principle also be carried out on the coating station, with the cycle time being increased. Furthermore, a third weighing device according to the present patent application can optionally be arranged downstream of the correction station. Belt conveyors can optionally be arranged between the weighing devices, coating station and correction station. The weighing devices are connected to a process control or a computer which carries out the required calculations for carrying out the method and controls the various components of the coating installation.

To produce the untreated coating, the coating suspension can be pumped into the carrier from below via the feed line 924 until the filling sensor reports that a defined filling height has been reached.

However, as an alternative thereto, coating suspension can also be metered via a metering nozzle for coating suspension 925 onto the upper end surface of the carrier and into the overflow in order to avoid an uncontrolled discharge.

Excess coating suspension is then removed from the passages of the carrier 91 by suction (preliminary suction) by opening a suction or throttle valve 926, or metered coating suspension is sucked onto the upper end surface of the carrier and a possible excess is sucked off.

For this purpose, a pipeline is connected to a negative pressure vessel (not shown here) and a demister. The negative pressure vessel is connected to a fan which maintains a negative pressure of between, for example, 50 and 500 and/or 300 mbar. The intensity and duration of the preliminary suction can be set with the aid of the throttle valve 926.

They determine the untreated amount of coating that remains on the carrier. This operation is also used to open up any passages which have become blocked by coating suspension.

Figure 9:
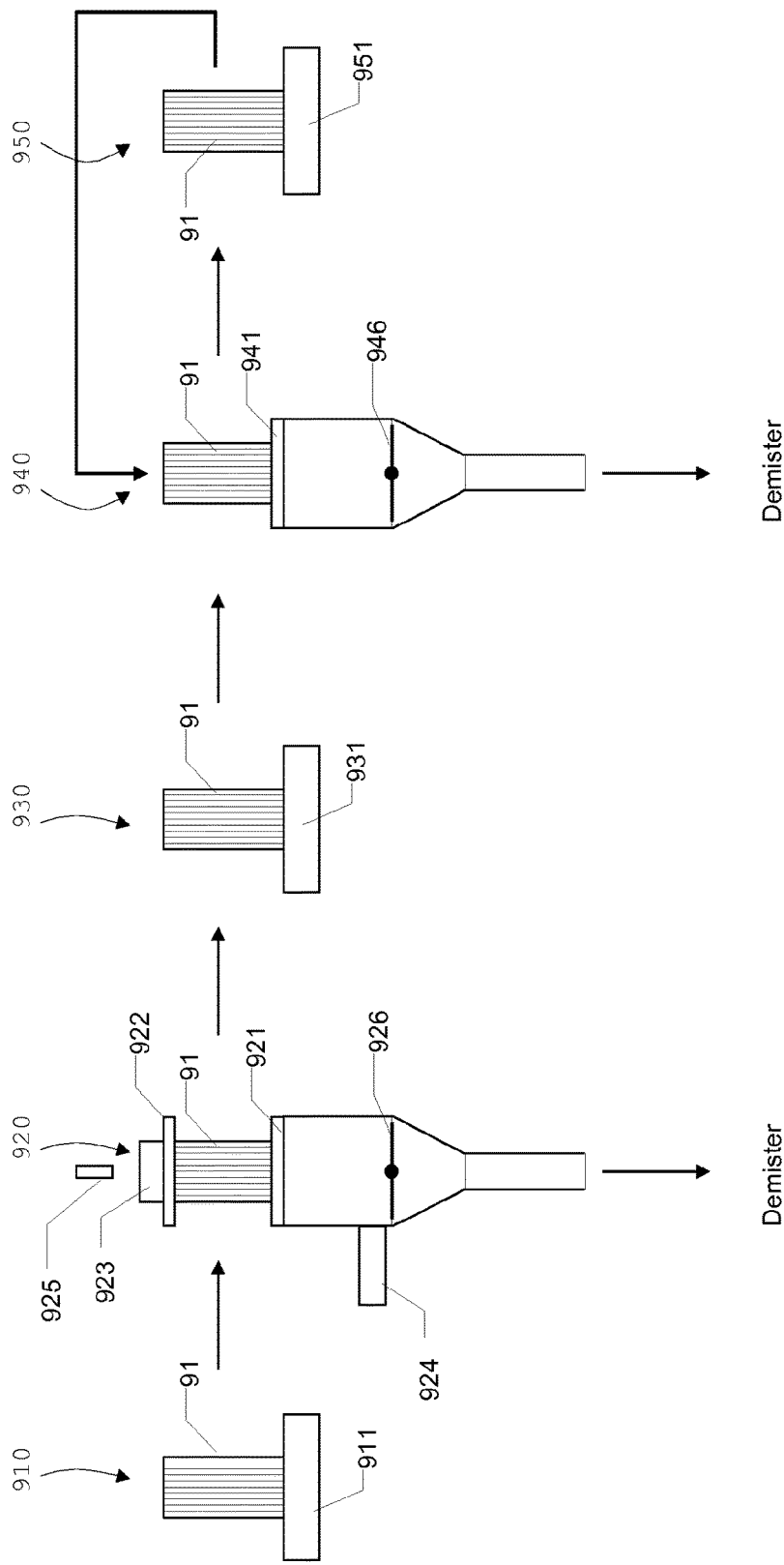
FIG. 9 shows the possible structure of a coating installation which is suitable for the method. The coating installation has a coating station 920 for producing an untreated coating. For this purpose, the carrier 91 which is to be coated is placed onto the holding elements provided for this purpose. By inflation of an inflatable rubber cuff 921, the carrier 91 is fixed on the station and sealed. Furthermore, it is possible to provide a second sealing cuff 922 which is fitted onto the upper end of the carrier 91 in order to tightly fix an overflow 923. A filling sensor and/or a metering nozzle for coating suspension 925 is arranged above the overflow 923 and is used to detect the sufficient filling of the carrier 91 and to be able to meter coating suspension onto the upper end surface of the carrier. A filling sensor can emit a signal to the device control or regulation of the coating installation.

FIG. 9 also shows a weighing station 930, in which the coated carrier 91 is weighed on a weighing device according to the present patent application 931. It is thereby possible to determine the amount of coating suspension in the carrier 91. In addition, it is possible to provide a weighing station 910, which is connected upstream of the coating station 920, with the weighing device according to the present patent application 911, which weighing device determines the weight of the carrier 91 before the coating.

Should it then emerge in the weighing station 930 that the loading of the carrier 91 with coating suspension is too high, the carrier is conveyed to a correction station 940, via which the excess coating suspension applied is removed. In the correction station 940, in a similar manner to the coating station 920, there is a sealing cuff 941, which fixes the carrier 91 tightly on the subsequent suction station 940. The amount of coating suspension sucked off is controlled or regulated here via a suction valve 946. On the other hand, should it be ascertained in the weighing station that the amount of coating applied is already below the threshold value, the carrier can be discharged from the coating installation without subsequent suction and supplied to a drying and calcining station (not illustrated here).

The correction station 940 is provided in FIG. 9 in order to remove excess coating applied by subsequent suction. As an alternative thereto, the correction station 940 can also be constructed identically to the coating station 920 and can likewise have a feed line for the coating suspension 924, and/or can be provided with a second sealing cuff 922 for the upper end of the carrier 91, and with an overflow 923 and/or a filling sensor and/or a metering nozzle for coating suspension 925. If, for example, a metering nozzle is used for the coating suspension 925 or if another possibility for introducing the coating suspension is used, a correction in the event of a lack of applied coating can, of course, also be accomplished at the correction station 940.

After the amount of coating has been corrected by subsequent sucking of or supply of further coating suspension, a further weighing of the carrier 91 in the weighing station 930 or in a further weighing station 950 particularly preferably takes place using a weighing device according to the present patent application 951, as illustrated in FIG. 9. Should it be ascertained on further checking of the amount of coating suspension in the carrier 91 that too much coating suspension is still located in the carrier 91, said coating suspension can be conveyed once again into the correction station 940. Otherwise, the carrier is discharged from the coating station and supplied to the drying and calcining station.

As already indicated, the weighing stations 930 and 950 can be amalgamated, depending on the desired flexibility and speed of the entire installation. Furthermore, the weighing station 930 and 950 can be combined with the subsequent suction station 940 or the coating station 920.

Figure 1:
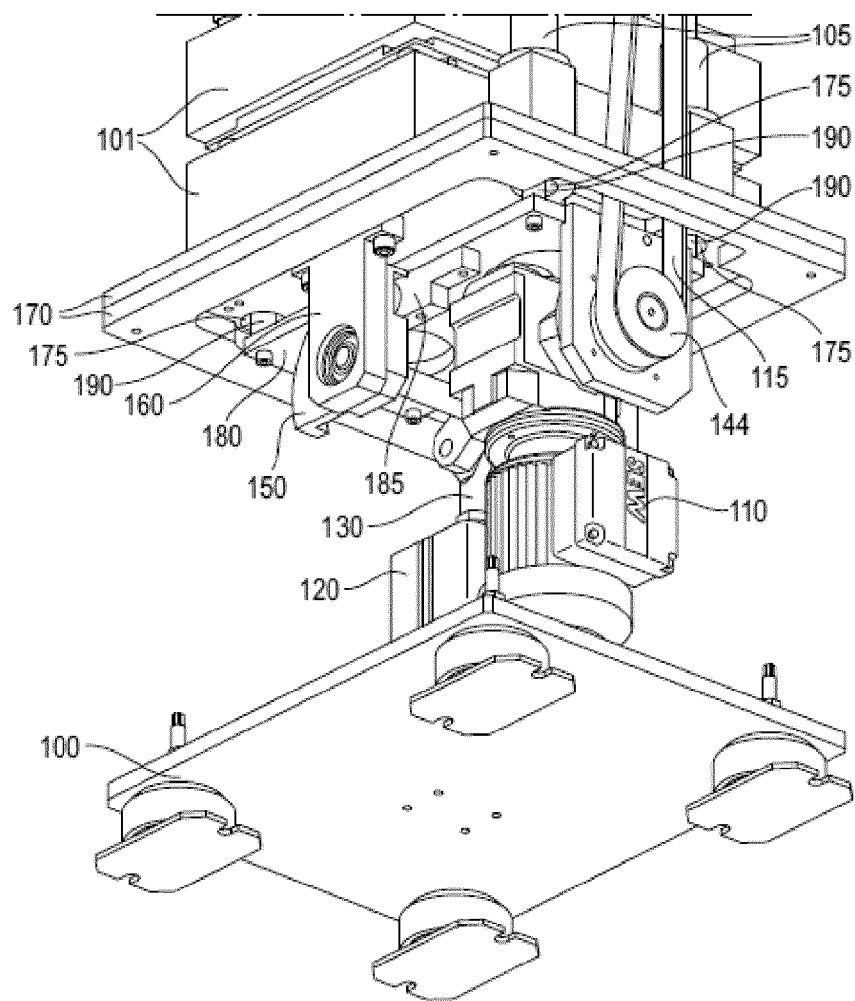
FIG. 1 shows part of the weighing device with a base plate 100 on which the actuator 120 is fastened. The actuator 120 uses a lever system 130 to move the eccentric disk 150 which is mounted rotatably in the bearing 160. The bearing 160 is not moved upward or downward during operation. The guide 185 of the carrying plate 180 is moved in the eccentric disk 150. If the eccentric disk 150 is therefore rotated, the carrying plate 180 moves up or down. In addition, the drive motor 110 which uses the driving roller 144 to drive the drive belt 115 and the conveyor belts of the belt conveyor is fastened to the carrying plate 180. The connecting elements 190 which connect the carrying plate 180 to the belt conveyor (not depicted) are also fastened to the carrying plate 180. The connecting elements are guided through openings 175 in the holding plate 170. The holding plate 170 is mounted immovably relative to the base plate, and the bearings 160 are fastened to the lower side of said holding plate, and the balances 101 are arranged on the upper side of said holding plate. In the figure, the guides 105 for the connecting elements 190, in which guides the connecting elements are mounted, are also mounted on the holding plate 170. During the operation, the holding plate 170 does not move and can be connected rigidly to the base plate 100, for example, by means of struts, supports or a housing.
Figure 2:
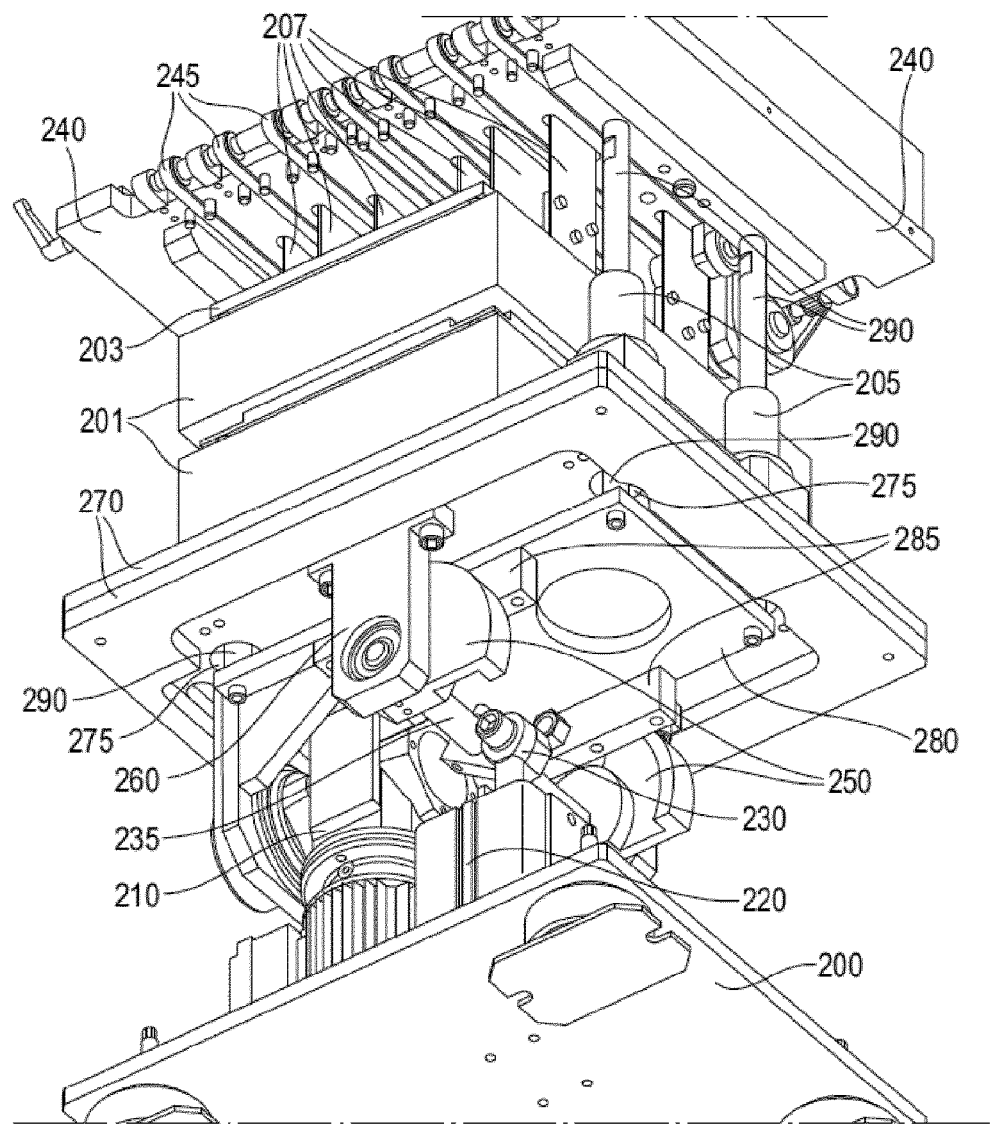
FIG. 2 shows the weighing device from a different perspective. As in FIG. 1, the base plate 200 to which the actuator 220 is fastened is depicted. The lever system 230 illustrated rotates the eccentric disks 250 which are mounted on the axle 235 and are held in the bearing 260. The guides 285 are moved by the eccentric disks 250 and are connected to the carrying plate 280, to which the drive motor 210 for the conveyor belts 245 of the belt conveyor is fastened. In addition, the connecting elements 290 are fastened by their lower side to the carrying plate, said connecting elements projecting through the openings 275 in the holding plate 270 and being guided by the guides 205 mounted on the holding plate 270. The connecting elements 290 are connected by their upper end to the body of the belt conveyor 240. The balances 201 are arranged one above another on the holding plate 270. Support extensions 207 which are guided through openings in the body of the belt conveyor 240 are mounted on the support surface 203 of the upper balance.
Figure 3:
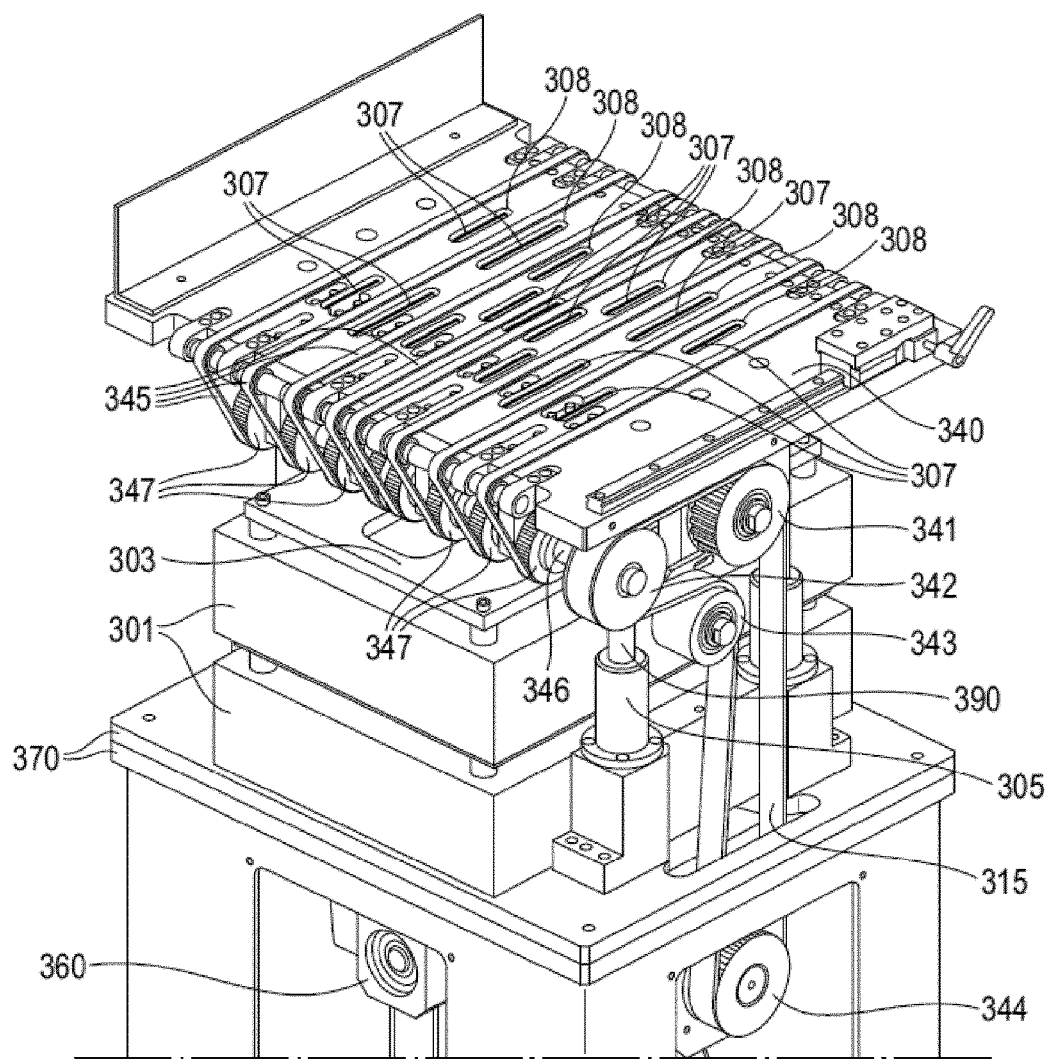
FIG. 3 shows the weighing device from a different perspective. Two balances 301 are arranged on the holding plate 370 to which the bearing 360 of the eccentric disk is fastened. The motor uses the driving roller to drive the drive belt 315 which is guided via a guide roller 341 and a tensioning roller 343 and uses a drive roller 342 to drive the transmission axle 346 which has a plurality of transmission rollers 347 which in each case drive one of the conveyor belts 345 of the belt conveyor. The body of the belt conveyor 340 has openings 308 in which the support extensions 307, which rest on the support surface 303 of the balances 301, are located. During the weighing operation, the body of the belt conveyor 340 is lowered along said support extensions 307. In this case, the connecting elements 390, which are connected to the body of the belt conveyor 340, move downward, guided by the guides 305.
Figure 4:
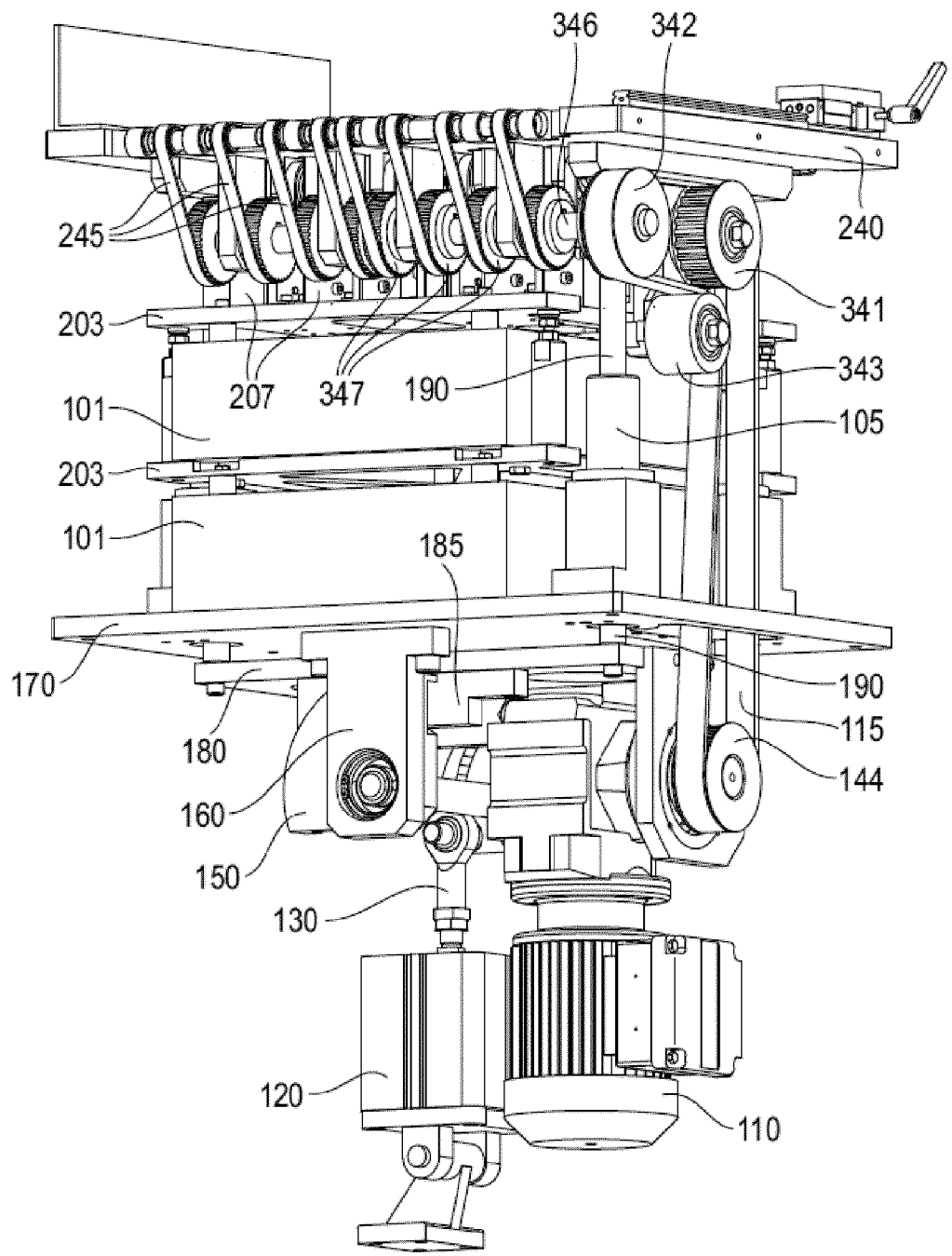
FIGS. 4 and 5 show the weighing device in a similar perspective as FIGS. 1 and 2, but without housing parts and from a different viewing angle.
Figure 5:
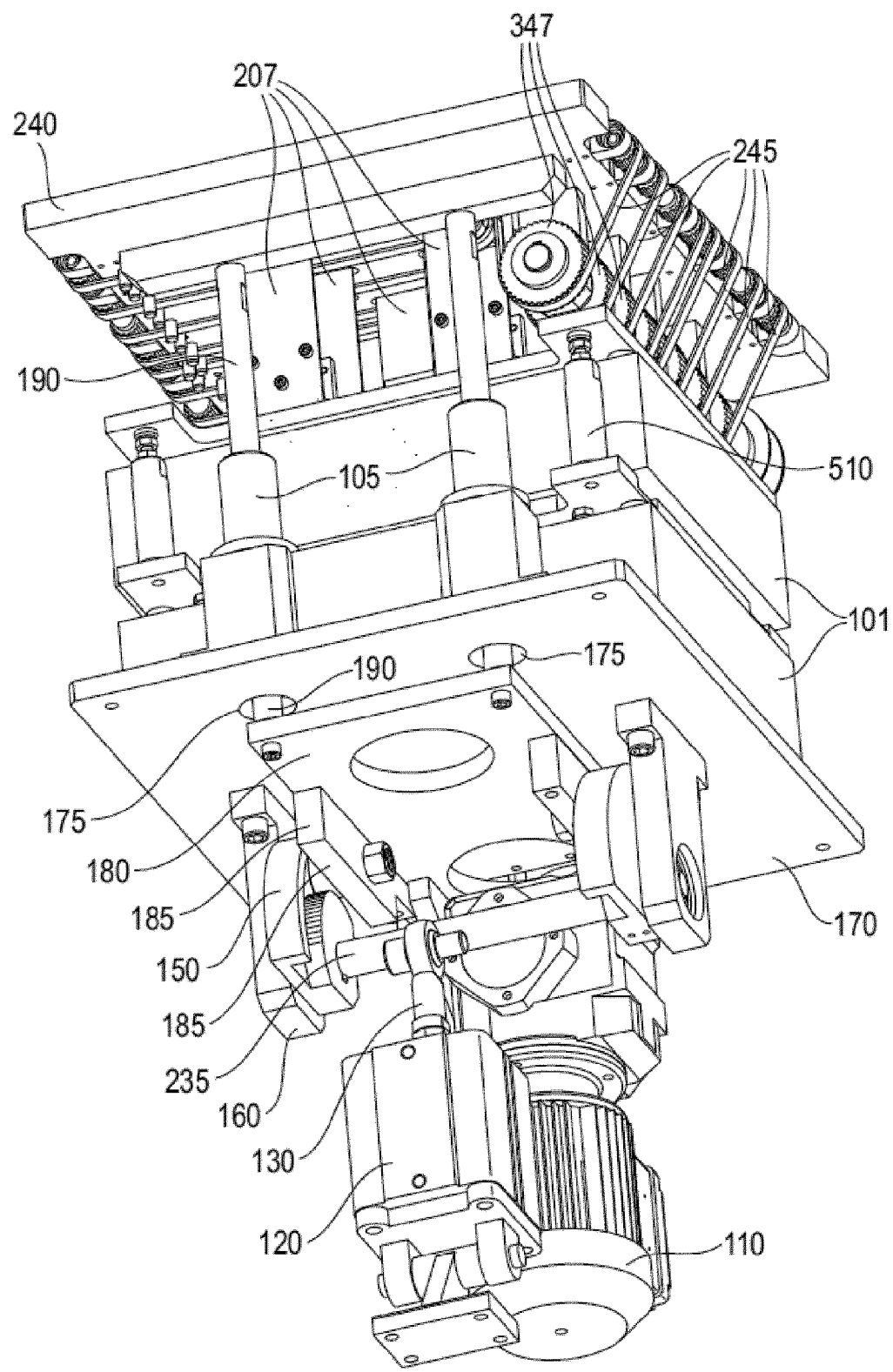
Figure 6:
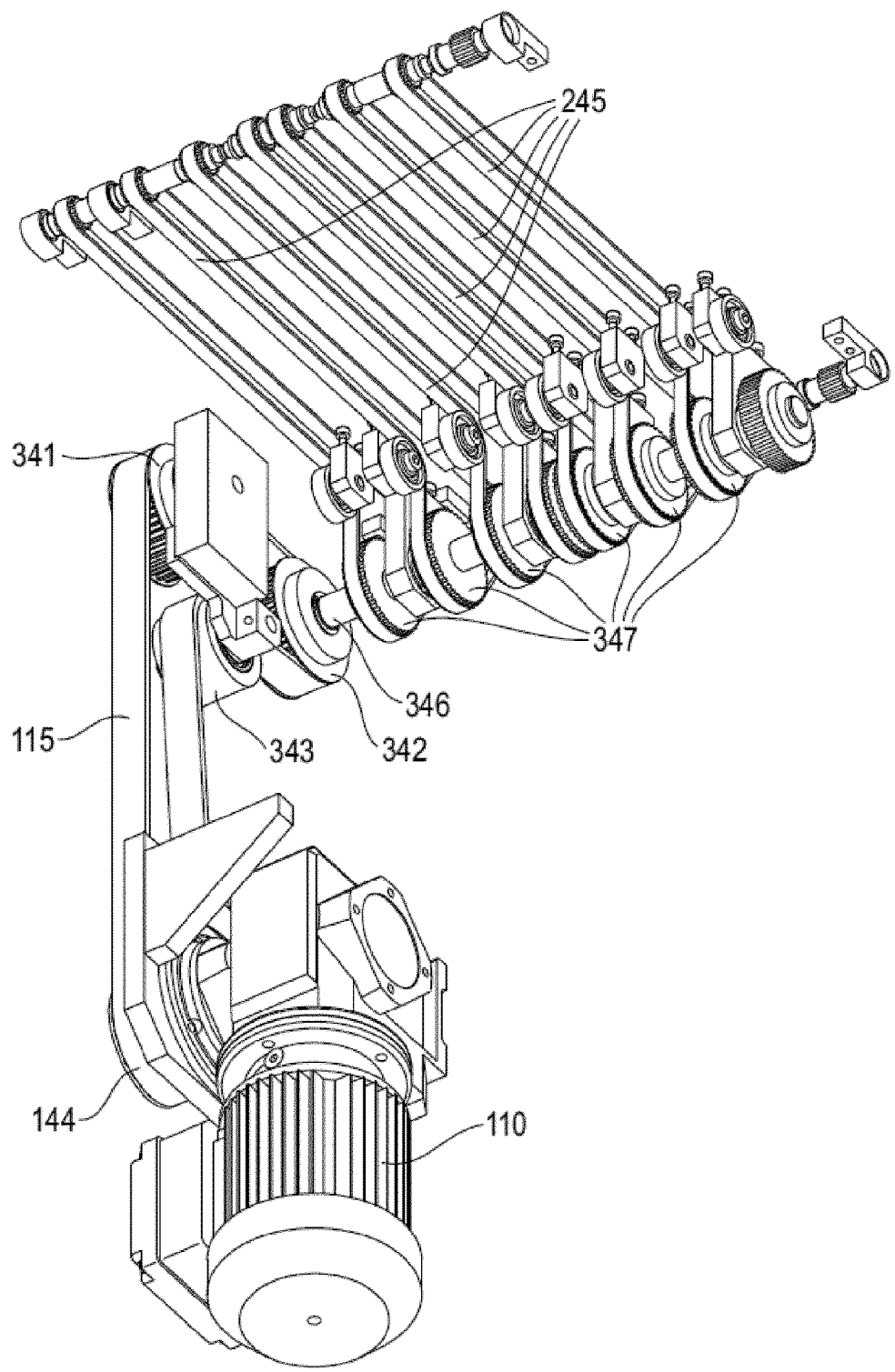
FIG. 6 shows the movable belt conveyor without the other parts of the weighing device and without the body of the belt conveyor 240.
Figure 7:
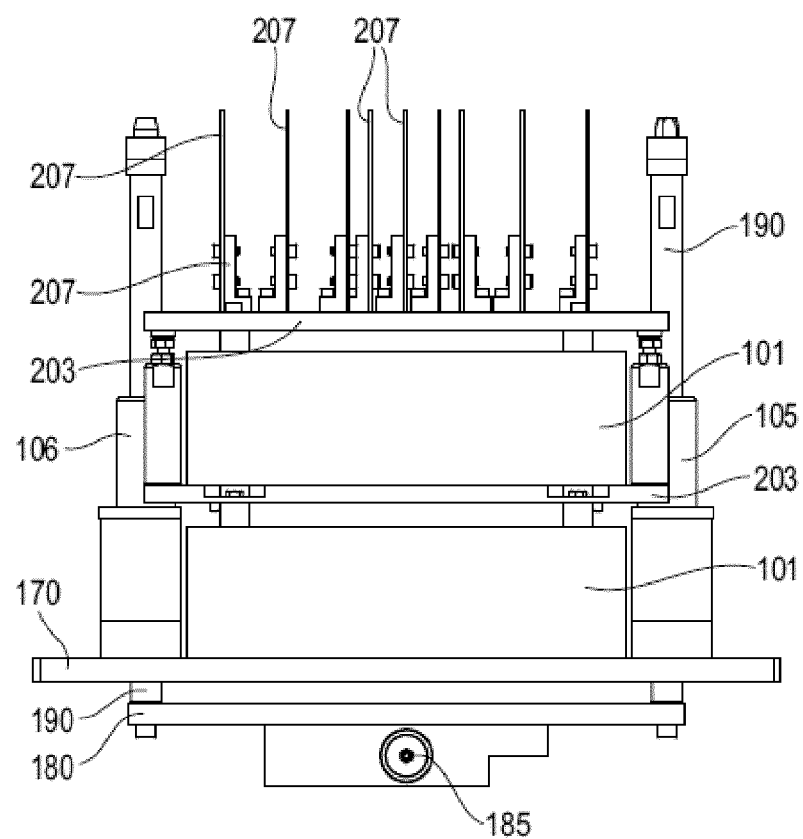
FIG. 7 shows the weighing device without the belt conveyor and without the body of the belt conveyor 240, but with parts of the mechanism for raising and lowering the belt conveyor.
Figure 8:
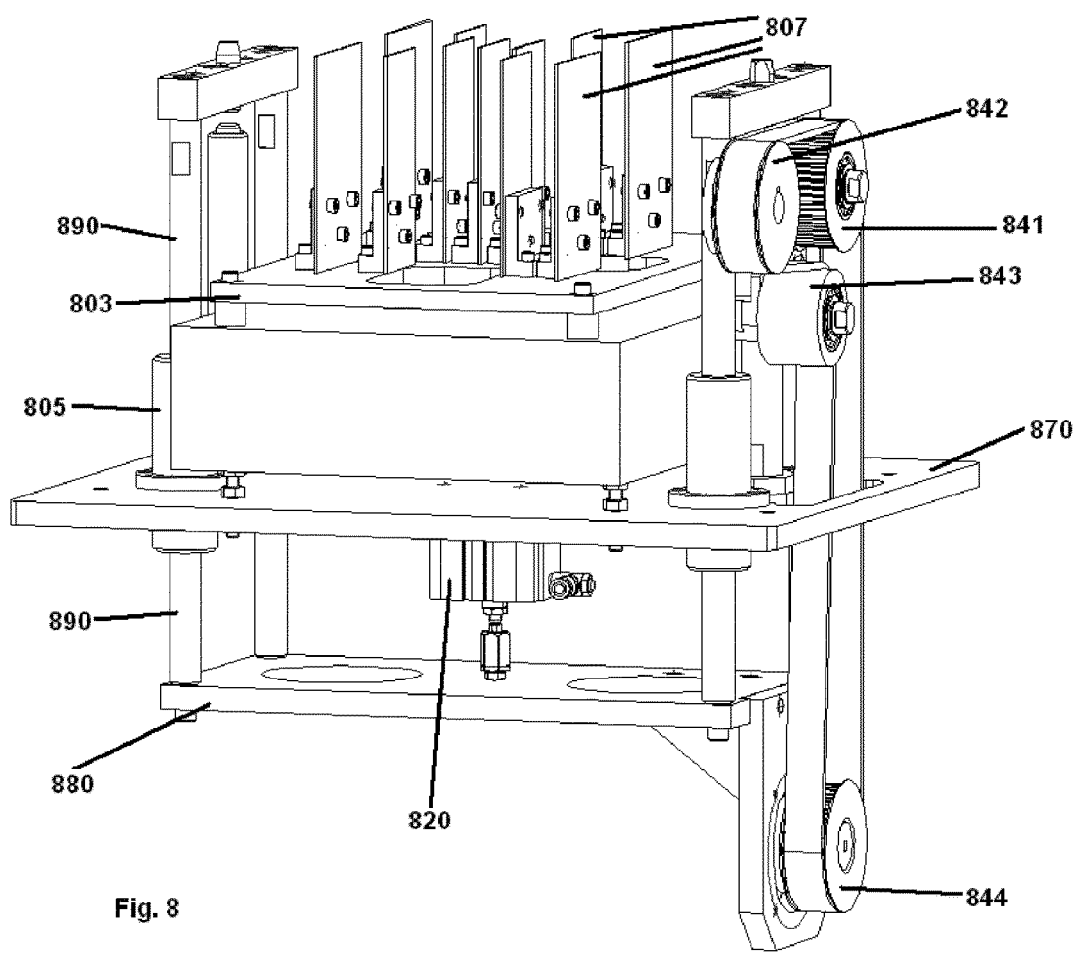
FIG. 8 shows a construction without fully depicting the belt conveyor which is attached to the connecting elements 890. A lever system and damping (end position damping), for example by an eccentric disk, are not provided here.

The reference numbers of FIGS. 4 to 7 are identical to the reference numbers of FIGS. 1 to 3.

List of Reference Numbers:

| | |
|---|---|
| Base plate 100, 200 | Transmission rollers 347 |
| Balance(s) 101, 201, 301, 801 | Eccentric disk 150, 250 |
| Support surface of the balance(s) 203, 303, 803 | Bearings 160, 260, 360 |

| List of Reference Numbers: | |
|---|---|
| Guides for connecting elements 105, 205, 305, 805 | Holding plate 170, 270, 370, 870 |
| Support extension 207, 307, 807 | Openings for connecting elements 175, 275 |
| Openings in the body of the belt conveyor 308 | Carrying plate 180, 280, 880 |
| Drive motor 110 | Guide of the carrying plate 185, 285 |
| Balance(s) 101, 201, 301, 801 | Connecting elements 190, 290, 390, 890 |
| Support surface of the balance(s) 203, 303, 803 | Carrier 91 |
| Guides for connecting elements 105, 205, 305, 805 | First weighing station 910 |
| Support extension 207, 307, 807 | Coating station 920 |
| Openings in the body of the belt conveyor 308 | First inflatable rubber cuff 921 |
| Drive motor 110 | Second inflatable rubber cuff 922 |
| Drive belt 115, 315, 815 | Overflow 923 |
| Actuator 120, 220, 820 | Feed line for coating suspension 924 |
| Lever system 130, 230 | Filling sensor/metering nozzle for coating suspension 925 |
| Axle 235 | Throttle valve 926 |
| Body of the belt conveyor 240, 340 | Second weighing station 930 |
| Guide roller 341, 841 | Weighing device according to present patent application 911, 931, 951 |
| Drive roller 342, 842 | Correction station 940 |
| Tensioning roller 343, 843 | Inflatable rubber cuff 941 |
| Driving roller 144, 844 | Suction valve 946 |
| Conveyor belts of the belt conveyor 245, 345 | Weighing station 950 |
| Transmission axle 346 | |

EXAMPLES

Ten carriers for car exhaust gas catalysts were weighed and the duration of the weighing determined. For this purpose, use was made of a weighing device with end position damping by an eccentric disk, as depicted in FIGS. 1 to 7, and, for the comparison tests, a weighing device without end position damping was used. A pneumatic cylinder was used in each case as the actuator. The time for the weighing cycle of each carrier was determined in seconds.

| Determination of the Cycle Time for a Complete Weighing Cycle | | |
|---|---|---|
| Steps | Weighing cycle: | |
| 1 | Transport of the part into position | |
| 2 | Taring the balance | |
| 3 | Lowering the belt conveyor | |
| 4 | Weighing the part | |
| 5 | Raising the belt conveyor | |
| 6 | Transporting away the part from the weighing station | |
| | Examples | Comparison Examples |
| Actuator | A pneumatic cylinder | A pneumatic cylinder |
| End position damping | Eccentric disk, see FIGS. 1-7 | None |
| 1 | 4.6 | 5.9 |
| 2 | 4.4 | 6.2 |
| 3 | 4.5 | 6.0 |
| 4 | 4.5 | 6.1 |
| 5 | 4.4 | 5.8 |
| 6 | 4.3 | 6.0 |
| 7 | 4.5 | 6.1 |
| 8 | 4.4 | 5.9 |
| 9 | 4.6 | 6.1 |
| 10 | 4.5 | 6.2 |
| Mean value | 4.47 | 6.03 |
| Median value | 4.5 | 6.05 |
| Standard deviation | 0.095 | 0.134 |

The invention claimed is:

1. A weighing device for a unit load, comprising a belt conveyor and one or more balances arranged below the belt conveyor, the one or more balances comprise a support for the unit load to be weighed, and the one or more balances are arranged rigidly, the belt conveyor has at least two conveyor belts, and the support for the unit load to be weighed is provided with one or more support extensions which can be guided through between the conveyor belts of the belt conveyor, and the conveyor belts of the belt conveyor can be moved toward the one or more balances in such a manner that the one or more support extensions are moved through between the conveyor belts without a dedicated movement, and the unit load moving on the conveyor belts can be placed onto the one or more support extensions and weighed by the one or more balances, wherein the belt conveyor arranged above the one or more balances can be moved toward the one or more balances, the end positions of the movement of the belt conveyor are damped, the belt conveyor is moved by a single actuator, and the one or more balances comprises at least two balances having different weighing regions, and wherein the entirety of the at least two conveyor belts of the belt conveyor are positioned above the one or more balances.

2. The weighing device as claimed in claim 1, which has a plurality of support extensions.

3. The weighing device as claimed in claim 1, wherein the conveyor belts each define an elongated belt loop that includes parallel elongated segments each positioned for travel above the one or more balances.

4. The weighing device as claimed in claim 1, wherein the one or more support extensions are arranged in two or three rows running transversely with respect to the conveying direction of the belt conveyor.

5. The weighing device as claimed in claim 1, wherein the belt conveyor has two to twenty conveyor belts.

6. The weighing device as claimed in claim 1, wherein the damping takes place mechanically or electronically.

7. The weighing device as claimed in claim 1, wherein the damping takes place mechanically via an eccentric disk.

8. The weighing device as claimed in claim 1, wherein the belt conveyor is moved by a hydraulic, pneumatic or electric actuator.

9. The weighing device as claimed in claim 1, wherein the weighing device has a sensor for detecting the transported unit load on the belt conveyor and the arrangement of the unit load relative to the one or more support extensions below the unit load.

10. The weighing device as claimed in claim 1, wherein the lifting movement is guided, in particular by a guide selected from the group consisting of ball guide, friction guide, column-type ball guide and combinations thereof.

11. The weighing device as claimed in claim 1, wherein the weighing device has two, three or four balances.

12. The weighing device as claimed in claim 1, wherein the one or more balances are encased and protected against interfering influences.

13. A method for weighing a unit load with a device as claimed in claim 1, comprising the following steps transporting the unit load to be weighed to a suitable position above the one or more support extensions;
stopping the belt conveyor;
optionally taring the balance(s);
lowering the unit load onto the one or more support extensions by lowering the belt conveyor in its entirety;
determining the weight of the unit load by the force effect thereof on at least one of the one or more balances;
raising the unit load from the one or more support extensions by raising the belt conveyor in its entirety;
transporting away the unit load.

14. A method for preparing a car exhaust gas catalyst, comprising weighing, with the weighing device of claim 1, a car exhaust gas catalyst goods piece as the unit load.

15. A coating installation for carriers of car exhaust gas catalysts, which has at least one first weighing device which is arranged upstream of a coating station for coating carriers for car exhaust gas catalysts, and a second weighing device which is arranged downstream of the coating station, wherein at least one of the weighing devices is a weighing device as claimed in claim 1.

16. A weighing device for a unit load, comprising a belt conveyor and one or more balances arranged below the belt conveyor and the one or more balances comprising a support for the unit load to be weighed, and wherein the one or more balances are arranged rigidly, the belt conveyor has at least two conveyor belts, the support for the unit load to be weighed is provided with one or more support extensions which can be guided through between the conveyor belts of the belt conveyor, and the conveyor belts of the belt conveyor can be moved toward the one or more balances in such a manner that the one or more support extensions are moved through between the conveyor belts without a dedicated movement, and the unit load moving on the conveyor belts can be placed onto the one or more support extensions and weighed by the one or more balances, wherein the belt conveyor arranged above the one or more balances can be moved in its entirety toward the one or more balances, the end positions of the movement of the belt conveyor are damped, the belt conveyor is moved by a single actuator, wherein the conveyor belts of the belt conveyor are exclusively guided above the actuator and the one or more balances such that all guiding elements of the conveyor belts are above the actuator and one or more balances.

17. The weighing device of claim 16 wherein the one or more balances comprises at least two balances having different weighing regions.

18. The weighing device of claim 16 wherein the weighing device further comprises a drive and a drive belt driven by said drive, said drive belt being in driving communication with a transmission axle of the belt conveyor which transmission axle is in driving communication with the conveyor belts, and said transmission axle is positioned in height above at least one of said one or more balances and is positioned within the respective loops formed by said conveyor belts, and said drive belt extends above and below the at least one of said one or more balances.

19. A weighing device for a unit load, comprising a belt conveyor and one or more balances arranged below the belt conveyor and the one or more balances comprising a support for the unit load to be weighed, and wherein the one or more balances are arranged rigidly, the belt conveyor has at least two conveyor belts, the support for the unit load to be weighed is provided with one or more support extensions which can be guided through between the conveyor belts of the belt conveyor, and the conveyor belts of the belt conveyor can be moved toward the one or more balances in such a manner that the one or more support extensions are moved through between the conveyor belts without a dedicated movement, and the unit load moving on the conveyor belts can be placed onto the one or more support extensions and weighed by the one or more balances, wherein the entirety of the at least two belts of the belt conveyor is arranged entirely above the one or more balances such that the belt conveyor can be moved in its entirety toward the one or more balances, the end positions of the movement of the belt conveyor are damped, the belt conveyor is moved by a single actuator, and said at least two conveyor belts are each configured as a belt loop, with infeed and outfeed sections of each loop of the at least two conveyor belts being positioned above at least one of the one or more balances positioned below the belt conveyor.

20. The weighing device of claim 19 wherein the one or more balances comprises at least two balances having different weighing regions.

* * * * *